No. 608,678. Patented Aug. 9, 1898.
W. HILLMAN.
MANUFACTURE OF VELOCIPEDE FRAMES.
(Application filed Dec. 6, 1897.)
(No Model.) 4 Sheets—Sheet 1.
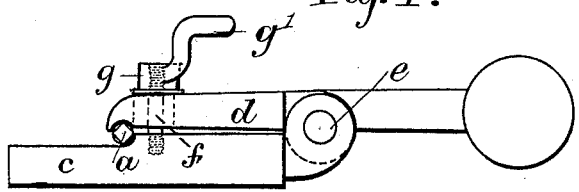
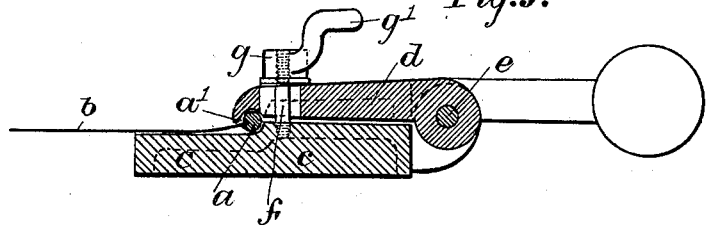
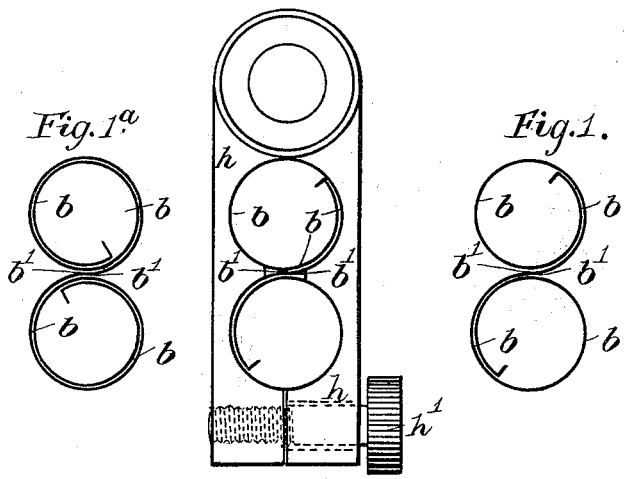
Witnesses.
Nellie Callahan
Lawrence B. Muzzy.
Inventor.
William Hillman,
by Wm H Fincrel
Atty.
THE NORRIS PETERS CO., PHOTO-LITHO., WASHINGTON, D. C.

No. 608,678. Patented Aug. 9, 1898.
W. HILLMAN.
MANUFACTURE OF VELOCIPEDE FRAMES.
(Application filed Dec. 6, 1897.)
(No Model.) 4 Sheets—Sheet 2.
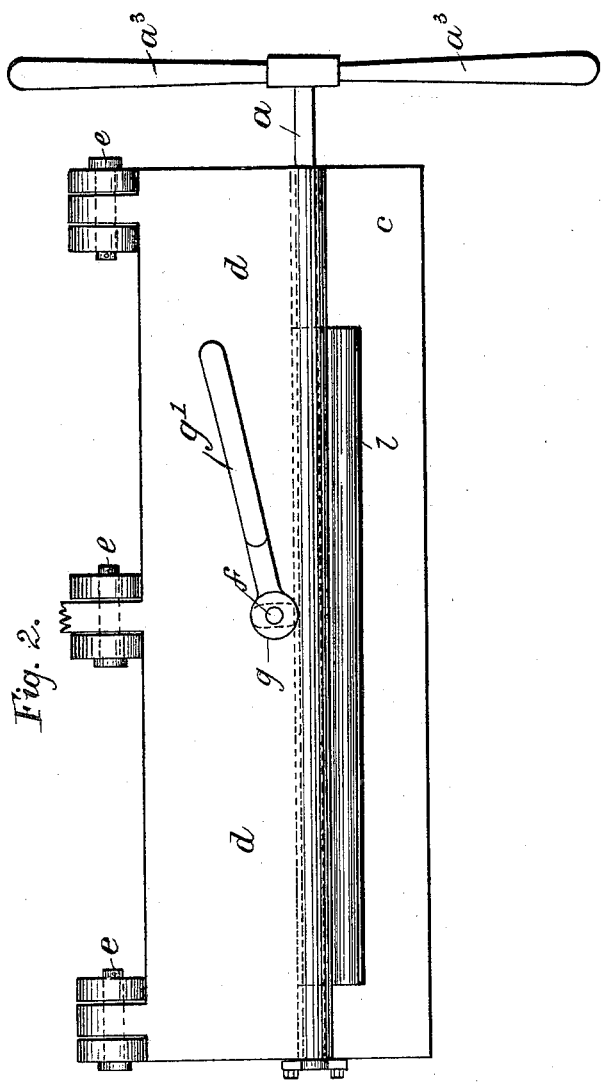
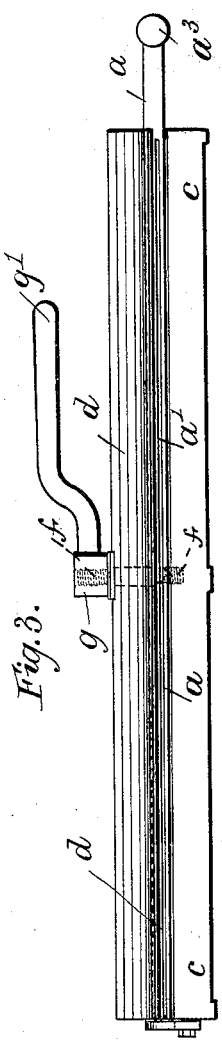

No. 608,678. Patented Aug. 9, 1898.
W. HILLMAN.
MANUFACTURE OF VELOCIPEDE FRAMES.
(Application filed Dec. 6, 1897.)
(No Model.)  4 Sheets—Sheet 3.
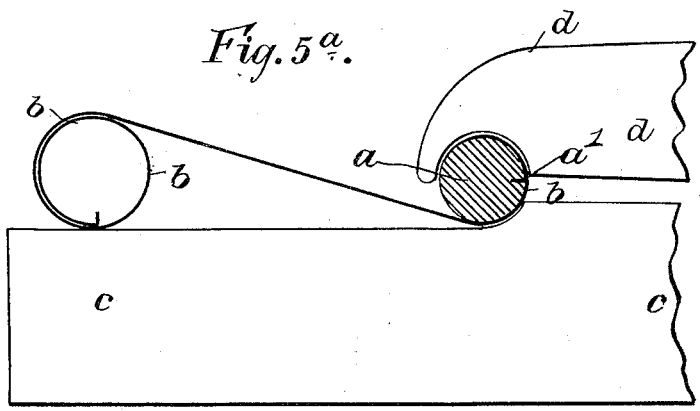
Fig. 5ª.

No. 608,678. Patented Aug. 9, 1898.
W. HILLMAN.
MANUFACTURE OF VELOCIPEDE FRAMES.
(Application filed Dec. 6, 1897.)
(No Model.) 4 Sheets—Sheet 4.
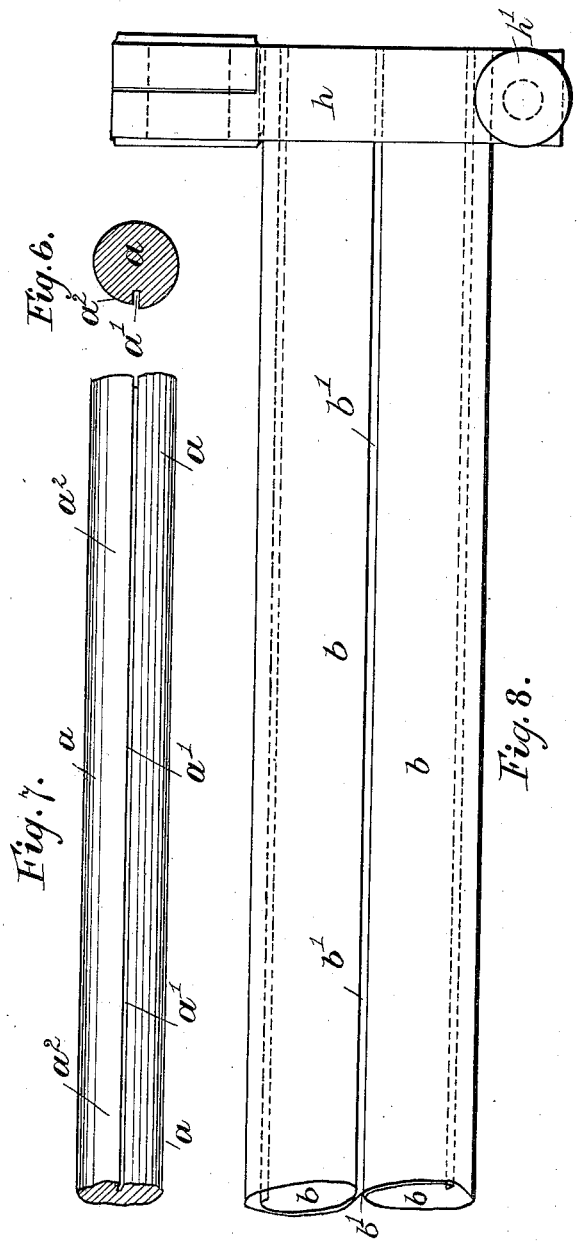
Witnesses.
Nellie Callahan.
Lawrence B. Muzzy.
Inventor.
William Hillman
by Wm H. Fincuel
atty.
THE NORRIS PETERS CO., PHOTO-LITHO., WASHINGTON, D. C.

UNITED STATES PATENT OFFICE.

WILLIAM HILLMAN, OF COVENTRY, ENGLAND.

MANUFACTURE OF VELOCIPEDE-FRAMES.

SPECIFICATION forming part of Letters Patent No. 608,678, dated August 9, 1898.

Application filed December 6, 1897. Serial No. 660,968. (No model.)

*To all whom it may concern:*

Be it known that I, WILLIAM HILLMAN, a subject of the Queen of Great Britain, residing at Coventry, in the county of Warwick, England, have invented certain new and useful Improvements in the Manufacture of Velocipede-Frames, but which are also applicable to the manufacture of metal tubing for other purposes, of which the following is a full, clear, and exact description.

The invention has for its object improvements in the manufacture of metal tubing to be used principally in the construction of velocipede-frames, but which is useful for other purposes.

The purpose of my invention is to produce tubing of greater strength and rigidity in proportion to its weight than has been obtained by any of the processes heretofore in use.

My invention is illustrated in the accompanying drawings, in which—

Figures 1 and $1^a$ are end views of two pieces of tubing manufactured according to my invention. Fig. 2 is a plan, Fig. 3 a front elevation, Fig. 4 an end elevation, and Fig. 5 a cross-section, of apparatus suitable for manufacturing the said tubing. Fig. $5^a$ is a cross-section, drawn to an enlarged scale, of parts of the apparatus, showing a piece of tubing partly manufactured, one circle having been formed and the other in process of formation. Fig. 6 is a cross-section, and Fig. 7 a side view, of a mandrel forming part of said apparatus; and Fig. 8 is a plan, and Fig. 9 an end view, of a piece of tubing, showing a clamp at one end to hold it in position while being soldered.

In manufacturing tubing according to my invention I preferably take thin sheet crucible cast-steel of suitable width and length and roll or coil it upon itself from opposite sides and in opposite directions by the aid of a mandrel $a$ into the form of two tubes $b$ $b$, closely adjoining each other and with the connecting-web $b'$ passing from one to the other tangentially at the line of junction of the two tubes and somewhat in the form of the figure 8.

In carrying my invention into effect I employ either a cylindrical mandrel $a$, as shown in the drawings, or a slightly-conical mandrel, according to the shape of tubing I wish to make. I form a longitudinal slit $a'$ in the mandrel and preferably chamfer off or reduce one side of the slit, as shown at $a^2$. The mandrel $a$ is placed on the bed $c$ of the tube-forming machine, and the counterbalanced jaw $d$, hinged at $e$ to such bed, is closed over the mandrel and screwed down by the screw $f$ and nut $g$, which latter is furnished with a lever-handle $g'$ for facility of manipulation. I insert one edge of the strip of sheet cast-steel in the slit $a'$ of the mandrel and then by the aid of the handles $a^3$ rotate the mandrel until one side of the metal strip is rolled up into the desired form, the lever-nut $g$ being gradually screwed back as the rolling proceeds. The jaw $d$ is then freed by unscrewing the lever-nut $g$. The sheet of metal with one tube formed is slid off the mandrel. The edge of the uncoiled part of the metal sheet is then inserted in the slit $a'$ of the mandrel $a$. The jaw $d$ is then again screwed down and the operation repeated as before (see Fig. $5^a$) to complete the formation of the metal sheet into tubing of the form shown at Figs. 1, $1^a$, 8, and 9.

The strip of sheet metal may be of width to enable the tubes to be made of two or more complete thicknesses all around, as represented in Fig. $1^a$, or there may be only a more or less comparatively small overlap—such, for example, as that shown in Fig. 1.

When the sheet metal is completely rolled up to the form shown, I clamp each end thereof preferably by a hinged clamp $h$, the internal form of which is of the shape of two juxtaposed tubes and which is provided with a screw $h'$ to secure the jaws thereof together and to release the same. I then heat the tubing sufficiently to enable, preferably, soft solder to be run into the V-shaped spaces between the two tubes, when the said solder will run in between the double thickness of the tubing and firmly secure all together. The solder will of course be first run into one V-space and then into the other, or I may "tin" the sheet metal to form the tubes in any suitable manner, and then when the tubing is formed I by the aid of heat fuse the "tinning metal," (solder,) and thus secure or sweat it all together. By this means I am enabled to produce a tubing of high-quality sheet crucible cast-steel without materially reducing the hardness or stiffness thereof, and consequently without injury to the character of the metal used.

I would here remark that I have mentioned high-quality sheet crucible cast-steel as the metal I prefer to use in the manufacture of the improved tubing; but other suitable high-quality hard sheet metal may be employed so long as it shall possess the required strength and rigidity.

When constructing the frame of a velocipede, I coil or roll the tubing by the aid of a mandrel formed with a longitudinal slit, as above described, and then hold it in position by the aid of the jointed retaining clamps or clips *h*. I then insert the ends of the tubing into suitably-shaped lugs or sockets, and after the frame is thus built up I run solder, as above described, into the tubing, as also into the lugs or sockets, so as to hold all firmly together without applying an injurious heat thereto, or I may first tin the insides of the lugs or sockets and then secure the tubes therein by applying the requisite heat to fuse the tinning metal. After the solder has set I remove the jointed retaining clamps or clips *h* from the tubing.

It will be observed that the chief advantage of my improved tubing as compared with previous attempts to produce tubing from rolled or bent sheet metal is to be found in the great strength of my improved tubing at the point where the two circles touch one another. At this point there are at least three (and it may be five) thicknesses of metal, and the disposition of metal and solder is such that great rigidity is the result.

Having thus fully described my invention, what I claim, and desire to secure by Letters Patent, is—

1. Tubing, for velocipede-frames and for other uses, made of sheet metal coiled or rolled upon itself from opposite sides and in opposite directions into the form of two tubes closely adjoining each other, thereby forming two or more thicknesses at the junction of said tubes, substantially as described.

2. Tubing, for velocipede-frames and for other uses, made of sheet metal coiled or rolled upon itself from opposite sides and in opposite directions into the form of two tubes closely adjoining each other, and thereby forming two or more thicknesses at the junction of said tubes, and secured by solder at said junction, substantially as described.

In testimony whereof I affix my signature in presence of two witnesses.

W. HILLMAN.

Witnesses:
F. GIBSON,
G. MARTIN.